Jan. 26, 1932.  F. J. JACOBSON ET AL  1,842,452
APPLE AND ORANGE DISPENSER
Filed April 9, 1929  2 Sheets-Sheet 1
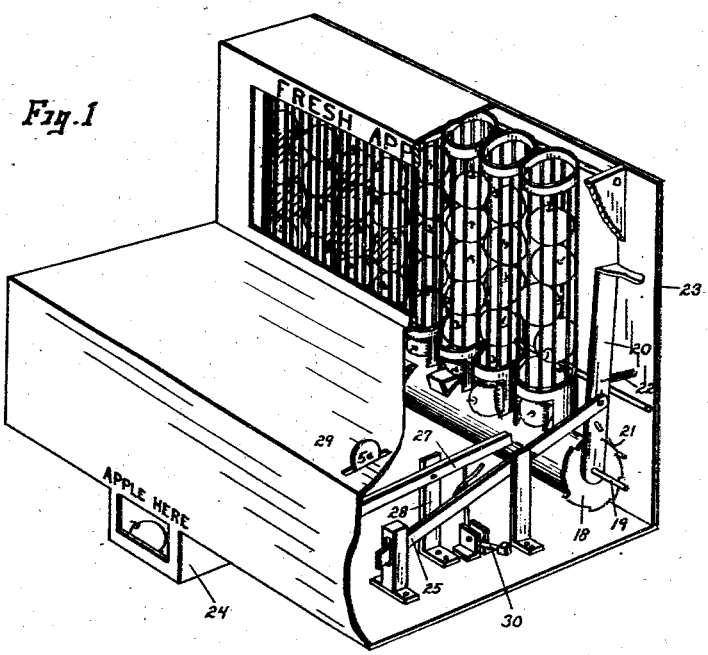
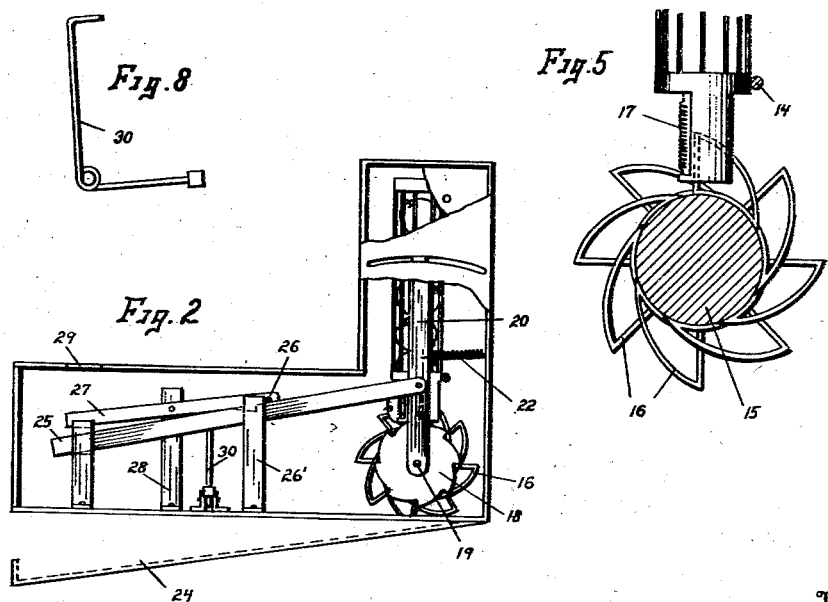
Inventors
F. J. Jacobson
E. J. Kauffman
Attorney

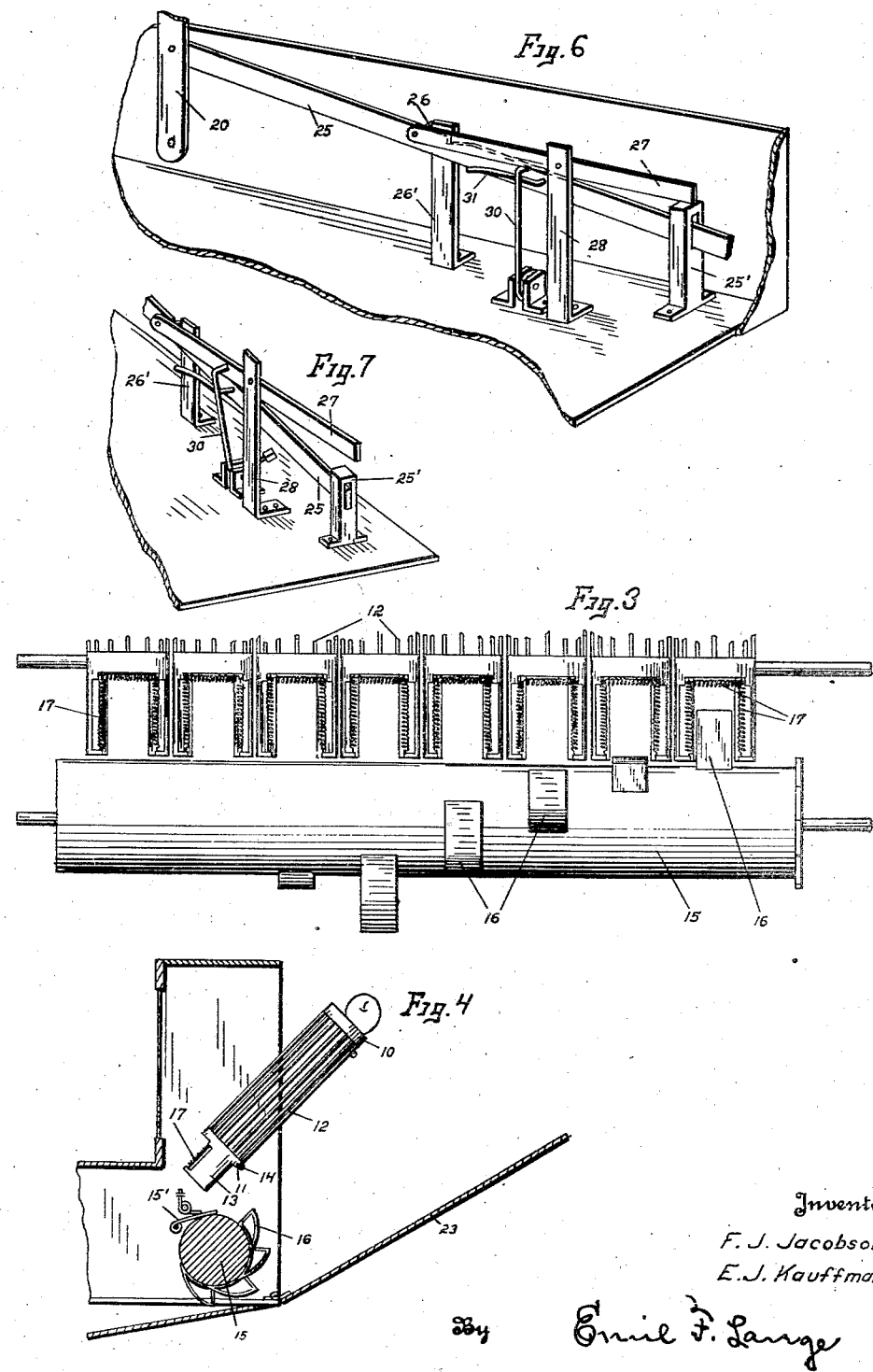

Patented Jan. 26, 1932

1,842,452

UNITED STATES PATENT OFFICE

FLOYD J. JACOBSON AND ERNEST J. KAUFFMAN, OF CHAPPELL, NEBRASKA

APPLE AND ORANGE DISPENSER

Application filed April 9, 1929. Serial No. 353,777.

Our invention relates to fruit dispensers, its object being the provision of an automatic dispenser for selling apples, oranges and other globular fruits.

Another of our objects is the provision of a dispenser which will prevent the careless handling of the fruit both by the dealer and by the customer.

Another of our objects is the provision of a dispenser of such design that the fruit will be protected from dust, the fruit being attractively on display and maintained in a fresh condition.

Another object which we have in view is the provision of a gate for discharging the fruit, the gate being maintained in latched relation except when released by the proper coin.

Another of our objects is the provision of a container or a battery of containers which are so arranged that they may be easily loaded without bruising the fruit.

Having in view these objects and others which will be pointed out in the following description, we will now refer to the drawings, in which Figure 1 is a view in perspective of our apple and orange dispenser, a part of the wall of the casing being broken away to disclose the actuating mechanism.

Figure 2 is a vertical sectional view of the apple and orange dispenser.

Figure 3 is a view in front elevation of the ejector roller and of the lower portions of the fruit container.

Figure 4 is a view in end elevation of the fruit container with a sectional view of a fragment of the casing, the view showing particularly the inclined position of the fruit container for loading the container.

Figure 5 is a transverse sectional view of the ejector roller and of a fragment of a lower portion of the fruit container showing the coaction between the ejector cups and the fruit container.

Figure 6 is a view in perspective of the mechanism for actuating the ejector, the parts being shown in unlatched position.

Figure 7 is a view in perspective of a portion of the actuating linkage shown in Figure 6 but showing the parts in latched position.

Figure 8 is a plan view of the weighted lever shown in Figures 6 and 7.

The device is intended to be used in dispensing apples, oranges and other globular fruit. For the purpose of storing the fruit we provide one or more vertical, cylindrical containers, the preferred form of container being shown in our drawings. As best shown in Figure 4, the cylinder is provided with an upper collar 10, a lower collar 11 and a plurality of rods 12 connecting the two collars. The lower collar 11 is provided with a projection 13 which is open at its front and rear sides. The collar 11 is pivotally connected at 14 so that the cylinder may be swung about its pivot 14 as an axis so that it will occupy either the position shown in Figure 2 or the loading position shown in Figure 4. The number of cylinders will depend to a large extent on the local activity of the demand for the fruit. In our construction we have shown a battery of eight cylinders but this number may be varied from one up to any desired number.

Underneath the cylinders is an ejector roller 15 having a spring pressed friction brake 15' and also staggered ejector cups 16. The cups 16 are equal in number to the cylindrical containers and they are so staggered on the roller 15 that the apples are ejected from successive containers when the roller is rotated. The portion 13 of the cylindrical container is spaced above the ejector roller 15 a sufficient distance to insure that the bottom apple rests on the roller 15 and the length of the portion 13 is such that no apple above the bottom apple can pass out through the front opening. The portion 13 of the container has an opening in its rear for permitting the ejector cups 16 to pass through and it has an opening in its front large enough to permit the passage of an apple. In order to still further prevent the accidental discharge of an apple from the cylinders, we provide coiled springs 17 or other suitable elastic members for frictionally engaging the apple when it passes out through the opening. It will be apparent that the movement of an ejector cup through the bottom portion of one of the cylindrical containers will carry the apple out through the front opening against the friction of the spring 17. The ejector roller 15 is provided with a ratchet 18 having teeth equal in number to the number of ejector cups 16 and to the number of apple or orange containers. Pivotally secured to the shaft 19 of the ejector roller 15 is a hand lever 20 having a pawl 21 pivotally connected thereto and adapted to actuate the ejector roller through an arc of sufficient size to remove an apple from one of the cylindrical containers. The hand lever 20 projects outwardly in a horizontal direction through an arcuate slot as best shown in Figure 2. It is provided with a spring 22 which automatically restores the lever to its inoperative position after which it is ready to be actuated again.

The entire mechanism is surrounded by a case in which the rear wall 23 is hinged, as best shown in Figure 4. The upper front wall is preferably provided with a window which gives the view of the contents. Underneath the casing is an inclined chute 24 which allows the apple or orange to roll to the front and this chute is provided with a stop for preventing the fruit from rolling out on to the ground, the aperture being sufficiently large for the introduction of a hand to remove the apple or orange. The latching lever 25 is pivotally connected to the hand lever 20 and projects forwardly therefrom, the forward extremity extending through a guide 25'. The device is coin controlled and the lever 25 must therefore be latched against movement except when the latch is released by means of the proper coin. The lever 25 is provided with a notch for receiving a laterally projecting arm 26 on the lever 27 which is pivotally secured to a support 28. In the latched position, the arm 26 is not only seated in the notch of the lever 25 but it also abuts against the rear edge of the standard 26' to effectually prevent any forward movement of the lever 25 when the parts are in latched relation. The casing is provided with a coin slot 29 through which the coin may be introduced to actuate the lever 27 so as to release the arm 26 from the notch of a lever 25 and to elevate the arm 26 above the standard 26'. The coin controlled mechanism is no part of our invention and is therefore not explained in detail. Any suitable coin controlled mechanism may be employed for the purpose and it is simply necessary that the introduction of the proper coin will depress the front end of the lever 27 to thereby lift the rear end of that lever.

The arm 26 must be prevented from returning to the notch in the lever 25 until after the lever 20 has been actuated to eject an apple and the arrangement must provide for the automatic relatching when the lever 20 returns to its normal inoperative position. As best shown in Figures 6 and 7, there is provided a weighted lever 30 which is pivotally connected to a support at the base of the casing. In Figure 7 the parts are in latched position and the upper extremity bears against the lever 27. When the forward end portion of the lever 27 is depressed to elevate the rear end portion, the weighted lever 30 swings on the pivot to bring the arm at the upper extremity of the lever 30 under the lever 27 to prevent the return of the arm 26 to the notch in the lever 25 so as to permit forward movement of the lever 25. The lever 25 has secured thereto a curved arm 31 in the path of the weighted lever 30 so that when the lever 25 is drawn forward, the arm 30 is moved away from the lever 27 so that the lever 30 will no longer prevent the seating of the arm 26 in the notch of the lever 25 and against the rear edge of the standard 26'. The rearward movement of the lever 25 under the action of the spring 22 will thus cause the arm 26 to be again seated in the notch of the lever 25 and behind the standard 26' so that the device becomes automatically latched until again released by another coin.

From the foregoing description it will be evident that we have provided a fruit dispenser of unique design and attractive simplicity. The fruit is visible to the purchaser and it is delivered to the purchaser without handling or otherwise soiling the fruit. It is protected not only from the hands of prospective purchasers but it is also enclosed so as to protect the fruit from dust. The fruit in the container presents an attractive and appetizing appearance and the operation of the mechanism will further induce the prospective purchaser to drop in his coin in order to obtain the fruit. While the actuating and latching mechanism is of great simplicity, this very simple design is such that the mechanism is not liable to get out of order either to jamb the mechanism to prevent the delivery of the fruit or to permanently unlatch the levers so that the containers might be emptied without introduction of a coin. The actuation of the hand lever after the linkage has been unlatched merely drops the fruit over the inclined surface of the roller to the chute 24 where it rolls gently toward the fruit opening.

Having thus described our invention in such full, clear, and exact terms that its construction and operation will be readily understood by others skilled in the art to which it pertains, what we claim as new and desire to secure by Letters Patent of the United States is:

1. In a fruit dispenser, a vertical cylindrical container for the storage of the fruit in stacked relation, an ejector roller rotatably mounted transversely of and beneath said container, an ejector member projecting from said roller, said member being adapted to pass through the bottom portion of said container when said roller is rotated to remove the fruit from the bottom of the stack in said container, and a coiled spring partially enclosing the discharge opening of said container for preventing accidental discharge of the fruit therefrom.

2. In a fruit dispenser, a vertical cylindrical container for the storage of the fruit in stacked relation, an ejector roller rotatably mounted transversely of and beneath said container, an ejector member projecting from said roller, said member being adapted to pass through the bottom portion of said container when said roller is rotated to remove the fruit from the bottom of the stack in said container, and an elastic friction member in the bottom opening of said container and contacting with the fruit for preventing accidental discharge of the fruit therefrom.

In testimony whereof we affix our signatures.

FLOYD J. JACOBSON.
ERNEST J. KAUFFMAN.